(12) United States Patent
Al-Nakhli et al.

(10) Patent No.: US 10,494,566 B2
(45) Date of Patent: Dec. 3, 2019

(54) ENHANCED OIL RECOVERY BY IN-SITU STEAM GENERATION

(71) Applicant: SAUDI ARABIAN OIL COMPANY, Dhahran (SA)

(72) Inventors: Ayman Raja Al-Nakhli, Dammam (SA); Michael J. Black, Ras Tanura (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 15/686,743

(22) Filed: Aug. 25, 2017

(65) Prior Publication Data

US 2017/0349819 A1    Dec. 7, 2017

Related U.S. Application Data

(62) Division of application No. 13/904,747, filed on May 29, 2013, now Pat. No. 9,803,133.

(Continued)

(51) Int. Cl.
*C09K 8/72* (2006.01)
*C09K 8/58* (2006.01)
(Continued)

(52) U.S. Cl.
CPC ............ *C09K 8/72* (2013.01); *C09K 8/58* (2013.01); *E21B 36/008* (2013.01); *E21B 43/16* (2013.01); *E21B 43/24* (2013.01); *E21B 43/25* (2013.01)

(58) Field of Classification Search
CPC .......... E21B 43/24; E21B 43/17; C09K 8/58; C06B 47/00
See application file for complete search history.

(56) References Cited

U.S. PATENT DOCUMENTS 3,638,727 A * 2/1972 Allen .................. E21B 43/247
166/259
3,712,380 A    1/1973 Caffey
(Continued)

FOREIGN PATENT DOCUMENTS

DE        19543534        2/1997
GB        2288197 A       10/1995
(Continued)

OTHER PUBLICATIONS

Preparation and Field Uses of Heat-Generating Hydrofracruing Fluids, 1997. Cheng et al.*

(Continued)

*Primary Examiner* — Angela M DiTrani Leff
*Assistant Examiner* — Avi T Skaist
(74) *Attorney, Agent, or Firm* — Bracewell LLP; Constance G. Rhebergen; Kevin R. Tamm

(57) ABSTRACT

Embodiments of the invention provide methods and composition for stimulating a hydrocarbon-bearing, heavy oil containing formation, a deep oil reservoir, or a tight oil reservoir, whereby exothermic reactants are utilized to generate in-situ steam and nitrogen gas downhole in the formation or the reservoir as an enhanced oil recovery process. An oil well stimulation method is provided, which includes injecting, into the one of the formation and the reservoir, an aqueous composition including an ammonium containing compound and a nitrite containing compound. The method further includes injecting, into the one of the formation and the reservoir, an activator. The activator initiates a reaction between the ammonium containing compound and the nitrite containing compound, such that the reaction generates steam and nitrogen gas, increasing localized pressure and improving oil mobility, in the one of the formation and the reservoir, (Continued)

thereby enhancing oil recovery from the one of the formation and the reservoir.

4 Claims, 3 Drawing Sheets

Related U.S. Application Data

(60) Provisional application No. 61/652,359, filed on May 29, 2012.

(51) Int. Cl.
  *E21B 36/00* (2006.01)
  *E21B 43/16* (2006.01)
  *E21B 43/24* (2006.01)
  *E21B 43/25* (2006.01)

(56) References Cited

U.S. PATENT DOCUMENTS

| | | | |
|---|---|---|---|
| 4,119,150 A | 10/1978 | Froelich | |
| 4,219,083 A | 8/1980 | Richardson et al. | |
| 4,330,037 A | 5/1982 | Richardson et al. | |
| 4,399,868 A * | 8/1983 | Richardson | C09K 8/528 166/300 |
| 4,482,016 A | 11/1984 | Richardson | |
| 4,756,776 A * | 7/1988 | Halliday | C06B 21/005 102/430 |
| 5,183,581 A | 2/1993 | Khalil et al. | |
| 6,035,933 A | 3/2000 | Khalil et al. | |
| 2006/0258541 A1 | 11/2006 | Crews | |
| 2008/0066784 A1* | 3/2008 | Sarkar | C09K 8/524 134/22.1 |
| 2008/0258541 A1 | 10/2008 | Kamikawa et al. | |
| 2009/0107680 A1 | 4/2009 | Surjaatmadja | |
| 2009/0260818 A1 | 10/2009 | Daniel et al. | |
| 2010/0263867 A1 | 10/2010 | Horton et al. | |
| 2012/0305255 A1 | 12/2012 | Zabolzhskiy et al. | |
| 2013/0126169 A1* | 5/2013 | Al-Nakhli | E21B 43/26 166/300 |
| 2013/0161012 A1 | 6/2013 | Al-Dahlan et al. | |
| 2013/0180720 A1 | 7/2013 | Al-Dahlan et al. | |
| 2014/0069647 A1 | 3/2014 | Daly | |
| 2014/0090839 A1 | 4/2014 | Al-Nakhli et al. | |
| 2014/0116701 A1 | 5/2014 | Tang | |
| 2014/0357893 A1 | 12/2014 | Peters | |
| 2015/0000912 A1 | 1/2015 | Choudhary et al. | |
| 2015/0175879 A1 | 6/2015 | Al-Nakhli et al. | |
| 2015/0300142 A1 | 10/2015 | Al-Nakhli et al. | |
| 2015/0300143 A1 | 10/2015 | Al-Nakhli et al. | |
| 2016/0264859 A1 | 9/2016 | Al-Nakhli et al. | |
| 2016/0319182 A1 | 11/2016 | Al-Nakhli et al. | |
| 2017/0130568 A1 | 5/2017 | Al-Nakhli et al. | |
| 2017/0130570 A1 | 5/2017 | Al-Nakhli et al. | |

FOREIGN PATENT DOCUMENTS

| | | |
|---|---|---|
| WO | 2015094159 A1 | 6/2015 |
| WO | 2015155589 A1 | 10/2015 |

OTHER PUBLICATIONS

Cuderman, J.F. et al., "Tailored-Pulse Fracturing in Cased and Perforated Boreholes", SPE 15253, 1986, pp. 1-10, Society of Petroleum Engineers.
International Search Report and Written Opinion for related PCT application PCT/US2016/060247 (SA5414/PCT) dated Jan. 20, 2017; 14 pages.
International Search Report and Written Opinion for related PCT application PCT/US2016/060267 (SA5415/PCT), dated Jan. 26, 2017; 15 pages.
U.S. Appl. No. 15/385,105, filed Dec. 20, 2016 "Non-Acidic-Exothermic Sandstone Stimulation Fluids" 004159.005692; pp. 1-28; figures 1-3.

* cited by examiner

ENHANCED OIL RECOVERY BY IN-SITU STEAM GENERATION

RELATED APPLICATION

This application is a divisional of and claims priority to and the benefit of U.S. Non-Provisional application Ser. No. 13/904,747, filed on May 29, 2013, which claims priority to and the benefit of U.S. Provisional Patent Application Ser. No. 61/652,359, filed on May 29, 2012, all of which are incorporated by reference in their entirety.

BACKGROUND

Field of the Invention

Embodiments of the invention generally relate to oil well stimulation and compositions for the stimulation of hydrocarbon bearing, heavy oil containing formations, deep oil reservoirs, and tight oil reservoirs. More particularly, embodiments of the invention relate to enhanced oil recovery methods and compositions for stimulating a hydrocarbon-bearing, heavy oil containing formation, a deep oil reservoir, or a tight oil reservoir, whereby exothermic reactants are utilized to generate in-situ steam and nitrogen gas downhole in the formation or the reservoir as an enhanced oil recovery process.

Description of the Related Art

The recovery of unconventional hydrocarbons such as heavy oil is receiving great interest, as world energy demand increases along with global oil prices. Producing such high viscosity oil is complex and challenging, and usually requires chemical or thermal techniques.

One commonly employed technique for increasing the extraction of heavy oil from the oil reservoir is steam injection. Steam injection is considered an enhanced oil recovery process that uses thermal energy to stimulate the oil reservoir. Examples of conventional steam injection processes include, for example, cyclic steam stimulation and steam flooding.

Conventional cyclic steam stimulation includes three stages: injection, soaking, and production. Steam is first injected into the well for a specified amount of time to heat the oil in the surrounding reservoir to facilitate the flow of the oil. After injecting a specified amount of steam, the injected steam remains in the reservoir to "soak" for another specified amount of time (e.g., typically a few days). The "soaking" steam generates increased pressure in the reservoir, forcing oil to flow from the well. Subsequently, oil is produced from the well using artificial lift (e.g., mechanical extraction of the oil from the reservoir).

Steam flooding is another conventional steam injection process, whereby the heavy oil in the reservoir is heated to high temperatures to decrease the viscosity of the oil, causing the oil to more easily flow through the formation toward the producing wells. Conventional steam flooding relies on constructing a steam generating plant and injecting steam at a well head. Disadvantages of conventional steam flooding systems include high initial capital costs (e.g., associated with the steam generating plant), high operational cost, and heat loss due to distance from generators to downhole, which make conventional steam injection processes ineffective for recovering oil from deep oil reservoirs. Moreover, existing steam flooding systems are applicable for off-shore oil reservoirs, and are inapplicable for off-shore ones.

Because conventional steam injection processes have limited effect for stimulating hydrocarbons from deep heavy oil containing formations, off-shore formations or tight oil reservoirs with high operational cost, what is needed are enhanced oil recovery methods and compositions for the thermal recovery of hydrocarbons from deep heavy oil formations, off-shore, on-shore or from a tight oil reservoir, which require less initial capital costs and minimize the operational cost and heat loss in pipelines that are commonly present with conventional steam flooding processes.

SUMMARY

Generally, embodiments of the invention provide methods and compositions for stimulating hydrocarbon production from hydrocarbon-bearing heavy oil or reservoir oil by generating in-situ steam and nitrogen gas downhole in a heavy oil formation, a deep oil reservoir, or a tight oil reservoir.

In particular, embodiments of the invention are directed to methods and compositions that generate in-situ steam and nitrogen gas downhole in a heavy oil formation, a deep oil reservoir, or a tight oil reservoir to improve oil mobility for enhancing oil production. For example, various embodiments of the invention provide methods for injecting exothermic-reaction components that react downhole in the heavy oil formation, the deep oil reservoir, or the tight oil reservoir to generate the in-situ steam (e.g., heat) and nitrogen gas to recover deep heavy oil and/or hydrocarbons from the formation and reservoirs that conventional steam injection processes and compositions are unable to recover.

According to certain embodiments of the invention, as steam is generated downhole, heat delivery efficiency is maximized and heat loss due to under and/or overburdens is minimized compared to conventional steam injection processes and compositions. Furthermore, various embodiments of the invention provide a low cost method for delivering thermal energy to the formation and reservoirs to increase formation and reservoir temperature, respectively, improve oil mobility, and achieve high heavy oil and hydrocarbon recovery.

Accordingly, in accordance with one embodiment, there is provided an enhanced oil recovery method for recovery of oil from a heavy oil formation, a deep oil reservoir, or a tight oil reservoir. The enhanced oil recovery method includes injecting, into one of the formation and the reservoir, an aqueous composition including an ammonium containing compound and a nitrite containing compound. The method further includes injecting, into the one of the formation and the reservoir, an activator. The activator initiates a reaction between the ammonium containing compound and the nitrite containing compound, such that the reaction generates steam and nitrogen gas, increasing localized pressure and improving oil mobility, in the one of the formation and the reservoir, thereby enhancing oil recovery from the one of the formation and the reservoir.

In accordance with another embodiment, there is provided an oil well stimulation composition, which includes an ammonium containing compound, a nitrite containing compound, and an activator. The activator initiates a reaction between the ammonium containing compound and the nitrite containing compound, such that the reaction generates steam and nitrogen gas, increasing localized pressure and improving oil mobility, in the one of the formation and the reservoir, thereby enhancing oil recovery from the one of the formation and the reservoir.

BRIEF DESCRIPTION OF THE DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

As generally mentioned above, embodiments of the invention relate to the stimulation of hydrocarbon-bearing, heavy oil containing formations, deep oil reservoirs, and tight oil reservoirs to enhance oil production. Various embodiments of the invention address problems associated with conventional steam injection processes, by providing methods and compositions that utilize exothermic-reaction components to generate steam and nitrogen gas downhole in a formation or reservoir to enhance oil production, without the initial capital costs and injected heat loss at the pipelines that is commonly present with conventional steam injection processes. The methods and compositions, according to various embodiments of the invention, can greatly increase the production rate of oil from heavy oil containing formations, deep oil reservoirs, and tight oil reservoirs (i.e., low permeability formations and reservoirs), thus improving the economics of the development thereof.

Figure 1:
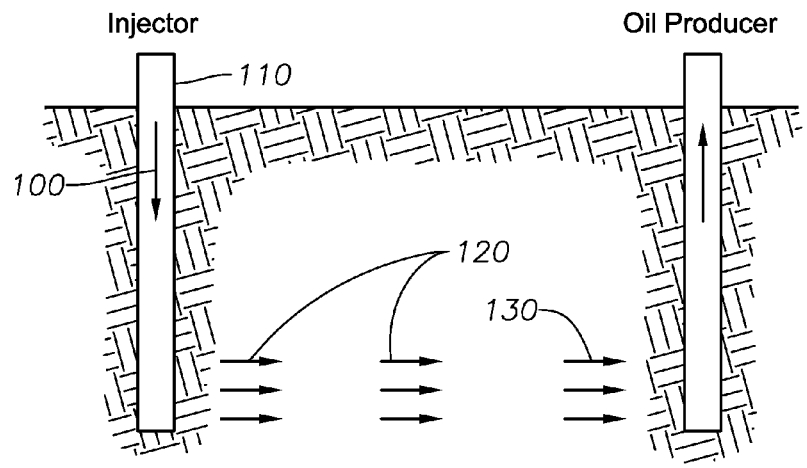
FIG. 1 is a schematic diagram of an enhanced oil recovery process, in accordance with an embodiment of the invention.
Figure 2:
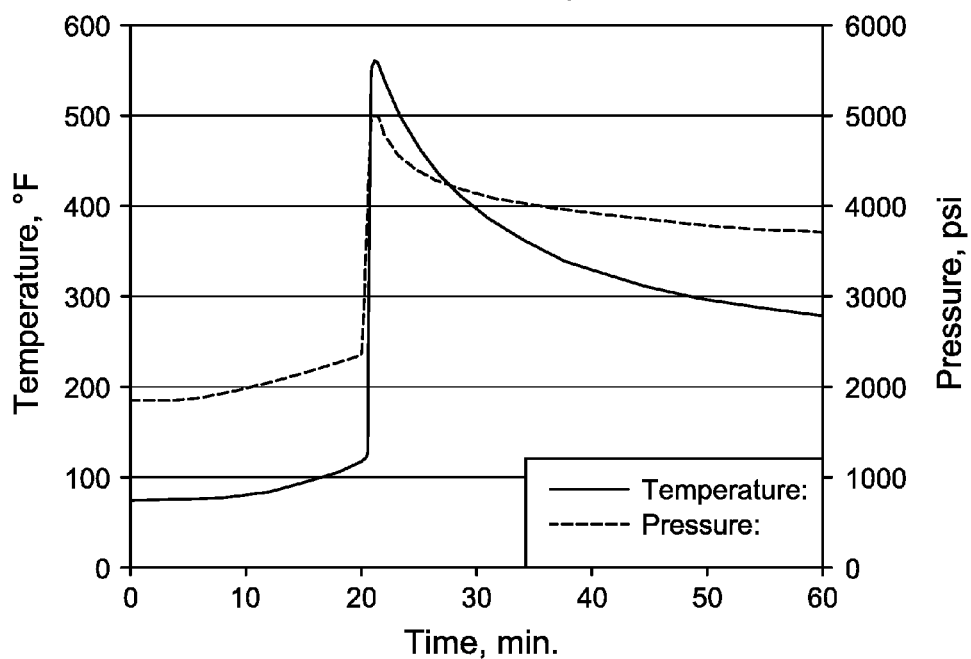
FIG. 2 is a graph showing a thermodynamic profile of an exothermic redox reaction of sodium nitrite and ammonium chloride for a reactor using the enhanced oil recovery process, as shown in FIG. 1, in accordance with an embodiment of the invention.
Figure 3:
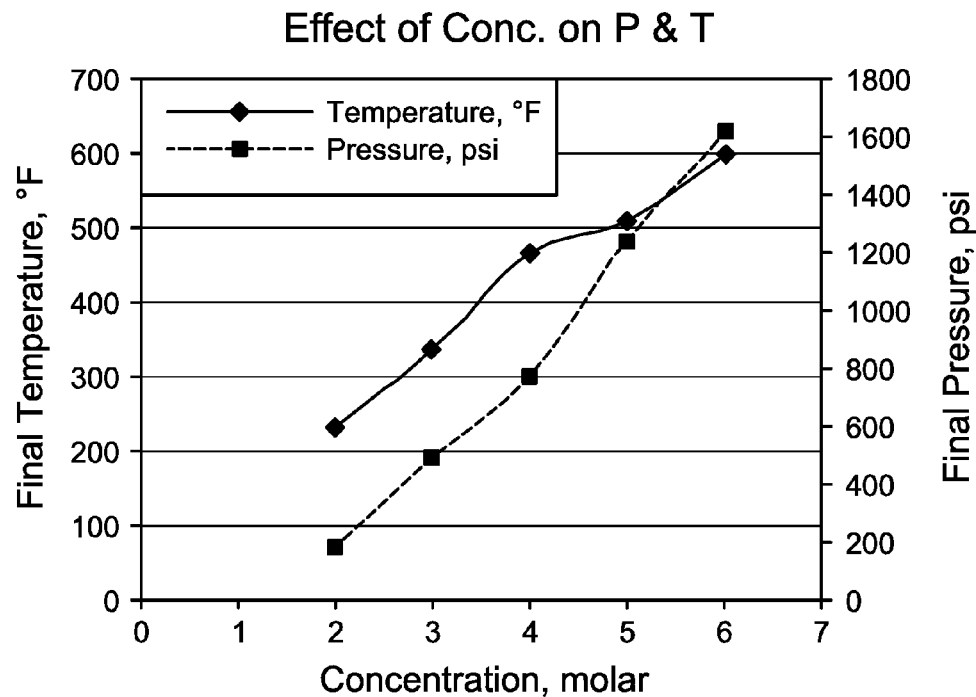
FIG. 3 is a graph showing an effect of the concentrations of reactants in an aqueous composition, used for the enhanced oil recovery process, as shown in FIG. 1, on the temperature and pressure in a formation or a reservoir due to an oxidation-reduction reaction, in accordance with an embodiment of the invention.

As shown in FIG. 1, in accordance with an embodiment of the invention, a method is provided for enhancing oil recovery from one of a formation and a reservoir. In accordance with certain embodiments, the formation includes a hydrocarbon-bearing heavy oil formation, and the reservoir includes one of a conventional oil reservoir, a heavy oil reservoir, a deep and shallow oil reservoir, an on-shore reservoir, an off-shore reservoir, a tar mat, and an oil sand. The method includes injecting, at 100, into the formation or the reservoir, an aqueous composition including an ammonium containing compound and a nitrite containing compound. In at least one embodiment, the aqueous composition includes 1 to 9M of an ammonium containing compound and 1 to 9M of a nitrite containing compound. In a preferred embodiment, the aqueous composition includes a 3 to 6M of an ammonium containing compound and 3 to 6M of a nitrite containing compound. In certain embodiments, the aqueous composition includes a 1:1 ratio of the 1 to 9M of the ammonium containing compound and the 1 to 9M of the nitrite containing compound. The concentration of the reactants in the aqueous composition corresponds directly to an increase in temperature and pressure in the formation or the reservoir due to an oxidation-reduction reaction, in accordance with various embodiments as will be described in more detail below (see FIGS. 2 and 3) The aqueous composition takes advantage of the oxidation-reduction reaction (also referred to as a ReDox composition) for the in-situ generation of steam and nitrogen gas downhole in the formation or the reservoir, thereby creating an area of high localized pressure. In accordance with one embodiment, 3M of the ammonium containing compound and 3M of the nitrite containing compound generated approximately 137,000 BTU/barrel of in-situ steam, as a non-limiting example. By creating this area of high localized pressure within the formation, for example, micro-fracturing of the nearby strata occurs, thereby improving the permeability of the near fracture surface of the formation, and improving oil mobility, both of which facilitate high heavy oil and hydrocarbon recovery from the formation. The high localized pressure created in the reservoir similarly improves the permeability of the reservoir and the oil mobility, both of which facilitate high heavy oil and hydrocarbon recovery from the reservoir.

The method further includes injecting, at 110, into the formation or the reservoir, up to 5 vol % (of the total volume) of a 0.1 to 1M activator. The activator initiates a reaction, at 120, between the ammonium containing compound and the nitrite containing compound, such that the reaction generates steam and nitrogen gas downhole in the formation or the reservoir for increasing the localized pressure in the formation or the reservoir, and improving mobility of oil, at 130, in the formation or the reservoir, thereby enhancing recovery of the oil from the formation or the reservoir. In accordance with at least one embodiment, the reservoir temperature is less than or equal to 150° F. (65.5556° C.) (i.e., a temperature reservoir to activate the oxidation-reduction reaction using the activator).

The methods and composition, in accordance with certain embodiments, generate and release two types of energy—kinetic energy and thermal energy, which is a result of the exothermic nature of the oxidation-reduction reaction. In accordance with one embodiment, an aqueous solution including an ammonium containing compound, for example, ammonium chloride ($NH_4Cl$) and a nitrite containing compound, for example, sodium nitrate (NaNO$_2$), are mixed with an injection of an activator, for example, an acid (H+), heat, or water (H+), whereby nitrogen gas (N$_2$), sodium chloride (NaCl), water, and heat are the byproducts (see Equation [1]). In-situ steam is generated from the heat produced by the oxidation-reduction reaction, and in conjunction with the nitrogen gas, increases the localized pressure in the formation or the reservoir, thereby enhancing oil mobility in the formation or the reservoir and hydrocarbon recovery therefrom.

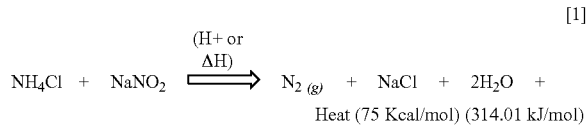

[1]

For each of the embodiments described herein, exemplary ammonium containing compounds include, for example, ammonium chloride, ammonium bromide, ammonium nitrate, ammonium sulfate, ammonium carbonate, and ammonium hydroxide.

For each of the embodiments described herein, exemplary nitrite containing compounds include, for example, sodium nitrite, potassium nitrite, sodium hypochlorite.

For each of the embodiments described herein, exemplary activators include, for example, weak acids, such as acetic acid, strong acids, such as hydrochloric acid, and dilute strong acids. In general, any compound that is capable of releasing an acidic hydrogen can be used as an activator. In certain preferred embodiments, acetic acid is used as the activator. In certain embodiments, a 0.1 M solution of acetic acid having a concentration of about 0.5 vol % (of the total volume) is utilized. In certain embodiments, dilute weak acids, such as dilute HCl, is utilized to activate the oxidation-reduction reaction, with or without the addition of a buffer. One main advantage of the utilization of dilute strong acids is the increased control over the reaction.

In various embodiments, the temperature within the formation or the reservoir is sufficient to serve as the activator or co-activator (along with the acid or other hydrogen-releasing compound) to activate the reaction between the components of the aqueous composition, while in other embodiments additional amounts of heat are supplied to the formation or the reservoir. For example, in certain embodiments, the temperature within the formation or the reservoir is about 90° C. or higher, alternatively at least about 70° C., and alternatively at least about 60° C. In some embodiments, the temperature within the formation or the reservoir is between about 60 to 70° C., and alternatively between 65° C. to 80° C. In a preferred embodiment, the temperature in the formation or the reservoir is at least 45° C., the temperature at which the oxidation-reaction in the formation or the reservoir is activated.

As noted above, in certain embodiments where the temperature of the formation or the reservoir is used to activate or initiate the oxidation-reduction reaction, a buffer is employed, such that the acidic hydrogen ions are slowly released. The buffer includes ethyl acetate, as a non-limiting example. In accordance with certain embodiments, the buffer is employed in the formation or the reservoir at a temperature of less than 75° C.

Exemplary combinations of reactants for the aqueous composition include, for example, urea and sodium hypochlorite, urea and sodium nitrite, ammonium hydroxide and sodium hypochlorite, ammonium chloride and sodium nitrite, and sodium nitrite and ammonium nitrate.

In certain embodiments, the aqueous composition includes equimolar amounts of the ammonium containing compound and the nitrite containing compound when they are supplied to the formation or the reservoir to ensure complete reaction of both components. In alternate embodiments, up to about a 5% excess of either component can be employed; however, it is generally preferred that equimolar amounts are employed. Thus, in certain embodiments, the ammonium containing compound and the nitrite containing compound are provided in a ratio ranging from between about 1.1:1 to 1:1.1, alternatively between about 1.05:1 and 1:1.05, and alternatively about 1:1.

In certain embodiments, the reaction between the ammonium containing compound and the nitrite containing compound in the presence of the activator results in the local generation of about 60 L of nitrogen gas per one liter of reactants and about 225 Kcal (942.03 kJ) of heat per one liter of reactants. In certain embodiments, the reaction of the ammonium containing compound and the nitrite containing compound in the presence of the activator results in the generation of at least about 50 Kcal (209.34 kJ) of heat per one liter of reactants, alternatively at least about 100 Kcal (418.68 kJ) of heat per one liter of reactants, alternatively at least about 150 Kcal (628.02 kJ) of heat per one liter of reactants, and alternatively at least about 200 Kcal (837.36 kJ) of heat per one liter of reactants.

In various embodiments, the heat generated from the oxidation-reduction reaction generates at least about 15 times the required heat to vaporize water downhole in the formation or the reservoir. For example, in accordance with certain embodiments, the downhole temperature is increased by at least about 50° C., alternatively by at least about 75° C., and alternatively by at least about 100° C.

In certain embodiments, the method further includes injecting 0.1 to 1M of a non-acidic well stimulation fluid, for example, sodium hydroxide (NaOH), which prevents a premature reaction between the ammonium containing compound and the nitrite containing compound, thereby allowing the reactants to reach the formation or the reservoir before the high temperatures therewithin cause the reaction between the components of the aqueous composition.

The in-situ generation of heat and nitrogen gas (and resulting increase in pressure within the formation at the reaction site), increases the permeability of certain oil formations and reservoirs. For example, the heat and gas that are generated by the oxidation-reduction reaction cause tensile and thermal fractures within the hydraulically induced and within the existing fractures in the formation. It is understood that the generation of microfractures within the formation or the reservoir may depend on the type of formation or reservoir being treated. This, coupled with the administration of the non-acidic well stimulation fluid described above, results in the increased production of oil recovery from the formation or the reservoir as both the aqueous composition and the non-acidic well stimulation fluid act on the formation or the reservoir in a manner that results in increased permeability.

In certain embodiments, the ammonium containing compound and the nitrite containing compound are injected into the formation or the reservoir approximately 5 minutes before the injection of the non-acidic well stimulation fluid, alternatively approximately 10 minutes before the injection of the non-acidic well stimulation fluid, and alternatively approximately 15 minutes before the injection of the non-acidic well stimulation fluid.

In certain embodiments, the inventive aqueous composition includes the ammonium containing compound and the nitrite containing compound, one of which is optionally encapsulated. The water and/or the heat of the formation or the reservoir facilitates the erosion of the encapsulated component, such that the reaction between the ammonium containing compound and the nitrite containing compound is delayed, allowing the aqueous composition to migrate and seep into the fractures within the formation or the reservoir.

In certain embodiments, the ammonium containing compound or the nitrite containing compound is optionally encapsulated with a binder to form a solid matrix with the component. Exemplary encapsulating binders include, for example, 55-carboxymethyl cellulose and xanthan. Exemplary binders are preferably reactive with water or the non-acidic well stimulation fluid, and/or heat, such that upon contact with the non-acidic well stimulation fluid or water, or upon heating, the binder erodes or dissolves, allowing the reactants of the aqueous composition to react with one another downhole in the formation or the reservoir.

In certain embodiments, the ammonium containing compound or the nitrite containing compound is optionally encapsulated with a polymer, for example, a hydrated polymer. Exemplary polymers include, for example, guar, chitosan and polyvinyl alcohol. In certain embodiments, the aqueous composition optionally includes a buffer.

Figure 4:
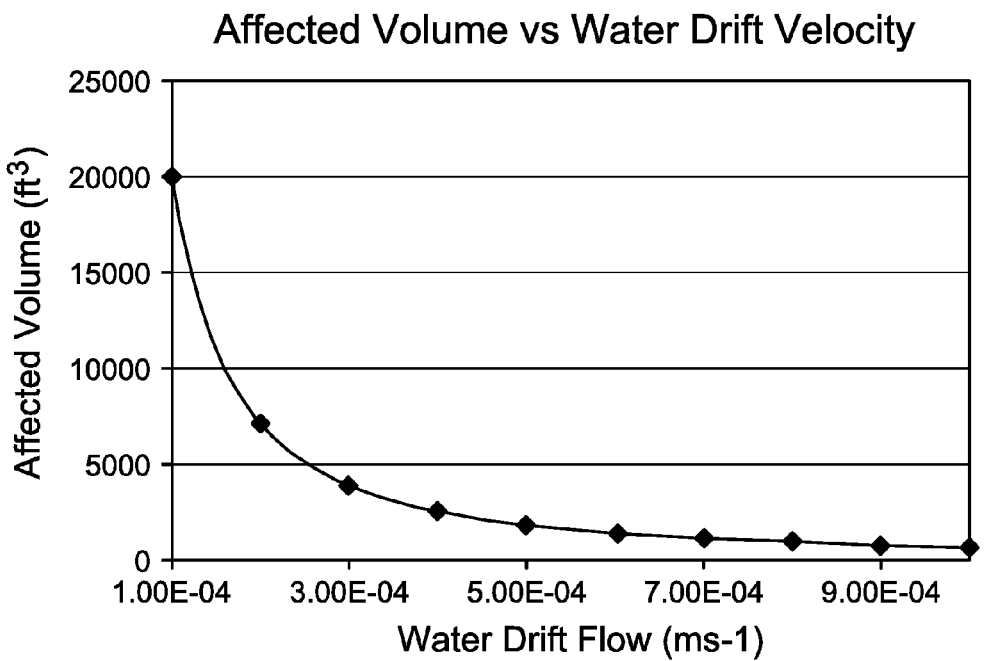
FIG. 4 is a graph showing the affected volume of recovered oil due to the heat and steam generated downhole in a heavy oil formation, a deep oil reservoir, or a tight oil reservoir using the enhanced oil recovery process, as shown in FIG. 1, in accordance with an embodiment of the invention.

Example of an estimation of generated heat downhole:

FIG. 4 is a graph showing the affected volume of recovered oil due to the heat and steam generated downhole in a heavy oil formation, a deep oil reservoir, or a tight oil reservoir using the enhanced oil recovery process, as shown in FIG. 1, in accordance with an embodiment of the invention. FIG. 4 shows that, when three barrels/min of one molar of reactants are injected downhole in a formation or a reservoir at a temperature of about 140° F. and a pressure of about 4300 psi (29647.425 kPa), assuming the formation or the reservoir porosity to be about 0.05 vol % (of the total volume), the required heat to vaporize water in the reservoir is about 150 KW. The heat generated downhole from the exothermic oxidation-reduction reaction discussed above for various embodiments is 2500 KW, which is 16 times the required heat to generate steam. The overall affected volume from the heat and generated steam downhole is estimated to be 4200 ft$^3$/h (118.93 m3/h). This will scale up and down with concentration, and therefore a 2 M solution would release 5.94 kg/s and so on.

These calculations are based around assumptions set out on pump flow rate in the paper by Marques, et al. "A New Technique to Troubleshoot Gas Hydrates Buildup Problems in Subsea Christmas Trees" SPE77572.

Figure 5:
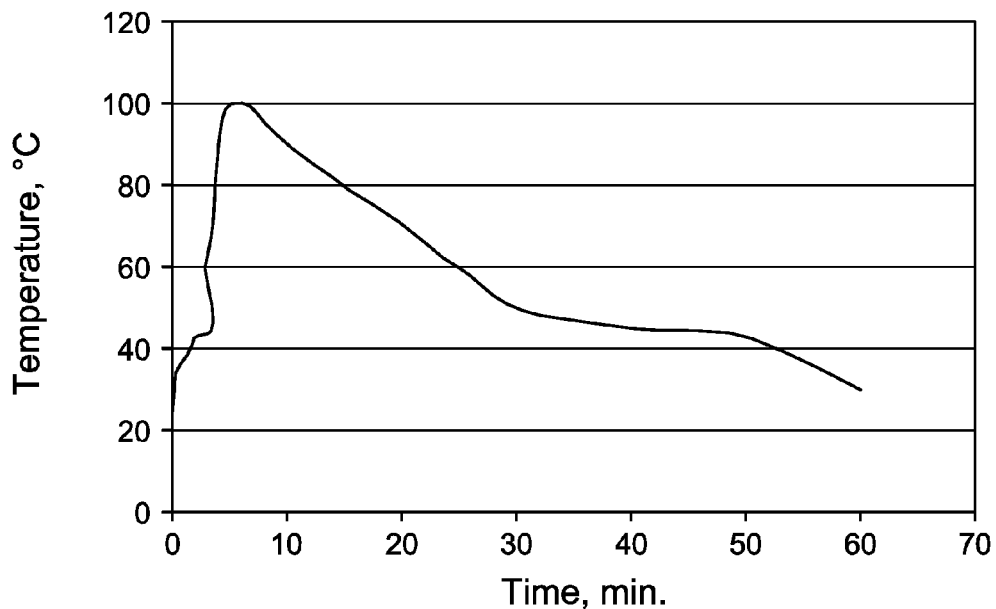
FIG. 5 is a graph showing a thermodynamic profile of an exothermic reaction to generate in-situ steam and nitrogen gas to enhance oil recovery, in accordance with an embodiment of the invention.

FIG. 5 is a graph showing a thermodynamic profile of an exothermic reaction to generate in-situ steam and nitrogen gas to enhance oil recovery, in accordance with an embodiment of the invention. FIG. 5 shows the generation of heat as a function of time for the reaction of equimolar amounts of the ammonium containing compound (e.g., ammonium chloride) and the nitrite containing compound (e.g., sodium nitrite). As shown in FIG. 5, the temperature rises rapidly to a peak within about 10 minutes of reaction, maintains an elevated temperature for approximately 20 minutes, and slowly cools over the next 30 minutes. FIG. 5 provides a proof of concept that the temperature increases as a result of the exothermic oxidation-reduction reaction and that the reaction may be designed to reach a required temperature, such that thermal fractures in, for example, the formation or the reservoir are created. The thermodynamic results of the reaction show an increased temperature from room temperature up to 100° C. The generated temperature is a function of reactants concentrations. In accordance with certain embodiments, the downhole temperature in the formation or reservoir is increased by at least about 50° C., alternatively by at least about 75° C., and alternatively by at least about 100° C.

Figure 6:
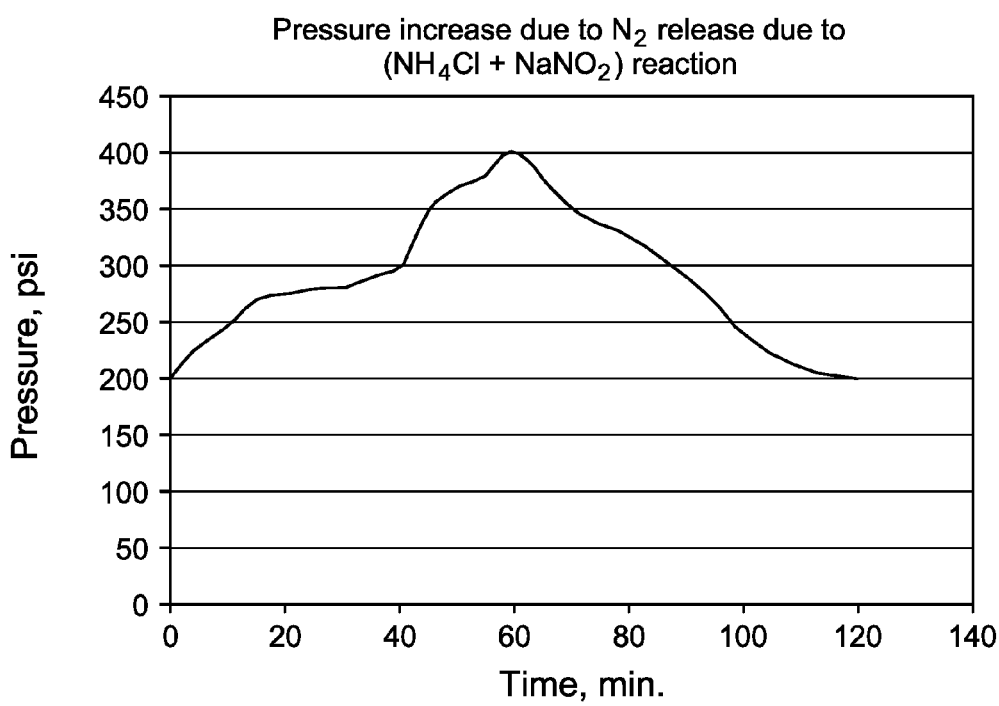
FIG. 6 is a graph showing a pressure profile of an exothermic reaction to generate in-situ steam and nitrogen gas to enhance oil recovery, in accordance with an embodiment of the invention.

FIG. 6 is a graph showing a pressure profile of an exothermic reaction to generate in-situ steam and nitrogen gas to enhance oil recovery, in accordance with an embodiment of the invention. FIG. 6 shows the amount of pressure generated by the reaction of the ammonium containing compound (e.g., ammonium chloride) and the nitrite containing compound (e.g., sodium nitrite). The test was run in a high temperature, high pressure (HT/HP) filter press apparatus. Prior to initiating the reaction, the HT/HP filter press apparatus was set at 200 psi (1378.95 kPa). The reaction showed that the pressure gradually increased to about 400 psi (2757.9 kPa) during the reaction. FIG. 6 further demonstrates that the pressure increase experienced in the formation or the reservoir is due to the nitrogen gas generated as a result of the oxidation-reduction reaction, and is a function of reactants concentration.

Advantageously, in contrast to some conventional stimulation methods, the methods and compositions described herein do not produce any damaging by-products as a result of the in-situ reaction. For example, the acids utilized as activators are typically consumed by the oxidation-reduction reaction and are only present in relatively small quantities, such that there is little or no residual acid remaining that may cause environmental concerns. As a result, following the stimulation procedure, no clean-up procedure is required.

The methods and compositions discussed herein solve several problems that are frequently encountered during the construction of commercial wells in deep oil and tight oil reservoirs.

First, problems associated with damage to the formation caused by current hydraulic fracturing methods can be eliminated. For example, the methods and compositions described herein, advantageously help to eliminate fracturing-fluid filtrate that can be locked near a recently created fracture surface by creating many tensile fractures near the fracture surface such that any filtrate readily flows through these fractures toward the well.

Second, the methods and compositions provided herein, advantageously enhance production over traditional hydraulic fracturing methods through the creation of microfractures, which provide additional conductivity to the near fracture surface, such that it provides new channels for gas to flow toward the created fracture. The additional reservoir volume contacting the well contributes significantly to the overall flow efficiency of the drainage area being affected by the induced fracture.

Finally, current hydraulic fracturing techniques that require many fracturing stages to create sufficient reservoir volume contact within the well to be commercial are eliminated as a result of the production of microfractures due to the gas and heat that are produced. By reducing the number of required fracturing stages for production, the present stimulation treatment described herein is both more cost effective and completed more quickly, thereby providing viable economical options for the stimulation of low producing wells.

The present invention may suitably comprise, consist or consist essentially of the elements disclosed and may be practiced in the absence of an element not disclosed. For example, it can be recognized by those skilled in the art that certain steps can be combined into a single step.

Unless defined otherwise, all technical and scientific terms used have the same meaning as commonly understood by one of ordinary skill in the art to which this invention belongs.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. An oil well stimulation composition for enhancing oil recovery from one of a formation and reservoir, consisting of:
   an ammonium containing compound in about 1M aqueous solution;
   a nitrite containing compound in about 1M aqueous solution; and
   an activator, the activator comprising about 0.1M acetic acid at about 0.5 volume percent of the oil well stimulation composition to initiate a reaction, without a buffer, between the ammonium containing compound and the nitrite containing compound and to be consumed by the reaction, such that the reaction generates steam and nitrogen gas and such that no residual activator remains to cause environmental concerns, increasing localized pressure and improving oil mobility, in the formation or the reservoir, where the ammonium containing compound and nitrite containing compound are present at concentrations sufficient to form thermal fractures within hydraulically induced and existing fractures in the formation or the reservoir to generate microfractures, including tensile and thermal fractures.

2. The oil well stimulation composition as defined in claim 1, wherein the ammonium containing compound is selected from the group consisting of ammonium chloride, ammonium bromide, ammonium nitrate, ammonium sulfate, ammonium carbonate, ammonium nitrile, and ammonium hydroxide.

3. The oil well stimulation composition as defined in claim 1, wherein the nitrite containing compound is selected from the group consisting of sodium nitrite, potassium nitrite, and sodium hypochlorite.

4. The oil well stimulation composition as defined in claim 1, wherein one of the ammonium containing compound and the nitrite containing compound is encapsulated.

* * * * *